(12) United States Patent
Subramanian et al.

(10) Patent No.: US 9,806,974 B2
(45) Date of Patent: Oct. 31, 2017

(54) EFFICIENT ACQUISITION OF SENSOR DATA IN AN AUTOMATED MANNER

(71) Applicant: Cisco Technology, Inc., San Jose, CA (US)

(72) Inventors: Vijaynarayanan Subramanian, San Jose, CA (US); Raghuram S. Sudhaakar, Sunnyvale, CA (US); David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 14/532,273

(22) Filed: Nov. 4, 2014

(65) Prior Publication Data

US 2015/0312125 A1    Oct. 29, 2015

Related U.S. Application Data

(60) Provisional application No. 61/982,976, filed on Apr. 23, 2014.

(51) Int. Cl.
| | |
|---|---|
| *G06F 15/173* | (2006.01) |
| *H04L 12/26* | (2006.01) |
| *H04L 29/06* | (2006.01) |
| *H04L 29/08* | (2006.01) |

(52) U.S. Cl.
CPC .......... *H04L 43/0876* (2013.01); *H04L 65/80* (2013.01); *H04L 67/12* (2013.01); *H04L 69/22* (2013.01)

(58) Field of Classification Search
CPC ............. H04L 1/1838; H04L 29/06448; H04L 29/06476; H04N 21/2662

USPC .................................. 709/231, 224, 200, 217
See application file for complete search history.

(56) References Cited

U.S. PATENT DOCUMENTS

| | | | |
|---|---|---|---|
| 7,027,446 B2 | 4/2006 | Rosenfeld et al. | |
| 7,254,632 B2 | 8/2007 | Zeira et al. | |
| 7,519,733 B1 | 4/2009 | Thubert et al. | |
| 8,010,685 B2 | 8/2011 | Singh et al. | |
| 8,228,954 B2 | 7/2012 | Thubert et al. | |
| 8,495,072 B1 | 7/2013 | Kapoor et al. | |
| 8,724,533 B2 | 5/2014 | Thubert et al. | |
| 2005/0020886 A1* | 1/2005 | Hutchinson | A61B 5/00 600/300 |

(Continued)

OTHER PUBLICATIONS

Partial International Search Report in counterpart International Application No. PCT/US2015/026849, mailed Jul. 28, 2015, 5 pages.

(Continued)

*Primary Examiner* — El Hadji Sall
(74) *Attorney, Agent, or Firm* — Edell, Shapiro & Finnan, LLC

(57) ABSTRACT

Information describing a rule to be applied to a traffic stream is received at an edge network device. The traffic stream is received at the edge network device. A preliminary data analysis of the traffic stream is performed at the edge network device in accordance with the rule. A determination is made that further analysis of the traffic stream should be performed from a result of the preliminary analysis. The traffic stream data is sent to another network device for further analysis.

26 Claims, 7 Drawing Sheets

(56) References Cited

U.S. PATENT DOCUMENTS

| | | | |
|---|---|---|---|
| 2006/0230309 A1* | 10/2006 | Kromer | G06F 11/2294 714/11 |
| 2006/0268866 A1 | 11/2006 | Lok | |
| 2007/0121615 A1 | 5/2007 | Weill et al. | |
| 2007/0189185 A1* | 8/2007 | Chen | H04L 41/0893 370/252 |
| 2008/0250058 A1* | 10/2008 | Zadorozhny | G06F 17/30539 |
| 2009/0217343 A1* | 8/2009 | Bellwood | G06F 21/10 726/1 |
| 2010/0103837 A1 | 4/2010 | Jungck et al. | |
| 2011/0058479 A1* | 3/2011 | Chowdhury | H04L 45/04 370/237 |
| 2011/0173441 A1 | 7/2011 | Bagepalli et al. | |
| 2012/0054136 A1* | 3/2012 | Maulik | G06Q 10/06 706/14 |
| 2012/0197852 A1 | 8/2012 | Dutta et al. | |
| 2012/0197856 A1 | 8/2012 | Banka et al. | |
| 2012/0197898 A1 | 8/2012 | Pandey et al. | |
| 2012/0197911 A1 | 8/2012 | Banka et al. | |
| 2012/0327779 A1 | 12/2012 | Gell et al. | |
| 2013/0159451 A1 | 6/2013 | Luciw | |
| 2013/0290305 A1 | 10/2013 | Feng et al. | |
| 2013/0307693 A1* | 11/2013 | Stone | G08B 25/00 340/573.1 |
| 2014/0036921 A1 | 2/2014 | Hutt et al. | |
| 2015/0254190 A1 | 9/2015 | Yang et al. | |
| 2015/0350809 A1 | 12/2015 | Yang | |
| 2016/0007137 A1 | 1/2016 | Ahn et al. | |
| 2016/0085594 A1 | 3/2016 | Wang et al. | |
| 2016/0112374 A1 | 4/2016 | Branca | |

OTHER PUBLICATIONS

E. Wes Bethel et al., "Accelerating Network Traffic Analytics Using Query-Driven Visualization", Visual Analytics and Technology, 2006 IEEE Symposium on Visual Analytics Science and Technology, Oct. 31-Nov. 2, 2006 Baltimore, MD, USA, 8 pages.

International Search Report and Written Opinion in counterpart International Application No. PCT/US2015/026849; mailed Oct. 5, 2015, 21 pages.

E. Wes Bethel et al., "Accelerating Network Traffic Analytics Using Query-Driven Visualizations", Visual Analytics and Technology, 2006 IEEE Symposium on, Oct. 31, 2006-Nov. 2, 2006, Baltimore, MD, XP031032021, ISBN: 978-1-4244-0591-6, 8 pages.

International Search Report and Written Opinion in counterpart International Application No. PCT/US2015/026847, mailed Jul. 29, 2015, 14 pages.

Bandyopadhyay et al., "Role of middleware for Internet of things: A study", 2011, International Journal of Computer Science and Engineering Survey 2.3, pp. 94-105.

Datta et al., "Smart M2M gateway based architecture for M2M device and Endpoint management", 2014, Internet of Things (iThings), 2014 IEEE International Conference on, and Green Computing and Communications (GreenCom), IEEE and Cyber, Physical and Social Computing (CPSCom), IEEE, IEEE, pp. 61-68.

* cited by examiner

FIG. 6

```
170(2)
    PUT /sensordemo.json HTTP/1.1
    Host: 128.107.165.80
    Authorization: Basic T3BlbkMvbnRleHQ6Zm9vYmFy
    Content-Type: application/config
    Content-Length: 529

{
        "meta" : (
            "ruleid" : "sensordemo",
            "context" : "OpenContext",
            "timer" : "3",
            "cache" : "1024",
        ),
        "network" : (
            "protocol" : "udp",
        ),
        "application" : (
            "protocol" : "http",
            "Filter-by" : (
                "Content-Type" : "application/json",
            ),
        ),
        "action" : (
            "type" : "event",
            "name": [ "GetHeader", "GetPayload" ],
            "endpoint" : (
                "method" : "http",
                "addr" : "172.27.231.28",
                "port" : "5001",
            ),
        ),
    }
```

EFFICIENT ACQUISITION OF SENSOR DATA IN AN AUTOMATED MANNER

PRIORITY CLAIM

This application claims priority to U.S. Provisional Application No. 61/982,976, filed Apr. 23, 2014, the entirety of which is incorporated herein by reference.

TECHNICAL FIELD

The present disclosure relates to data acquisition and analysis of data received at edge network devices, and in particular, efficient acquisition of sensor data in an automated manner.

BACKGROUND

In the evolution of the Internet, the term Internet of Things (IoT) has been coined to refer to the unique identifiable physical objects and their virtual representations interconnected in a vast network environment. These virtual representations may also be referred to as the Internet of Everything (IoE) within certain contexts, but there are distinctions between the two concepts. IoE is the networked connection of people, process, data and things. In contrast, IoT involves the networked connections of physical objects and data representations and does not include the people and process components. Hence, IoE comprises multiple dimensions of technology transitions, and may include IoT.

Today, more than 99% of things in the physical world are still not connected to the Internet. As sensor devices and nodes are attached to the Internet, they will generate vast amounts of data that will need to be processed. The amount of data generated will dwarf the already huge amount of Internet traffic generated today. From research predictions, more than 30 billion devices will be connected to the Internet by 2020.

The current underlying technical approach for processing IoT and/or IoE data is to "store first, analyze later" where all the data from the IoT and/or IoE is processed in the cloud and backend servers at a later time.

BRIEF DESCRIPTION OF THE DRAWINGS

FIG. 6 illustrates a second example of a specific JSON file in order to provide a rule, query and/or action, according to an example embodiment.

DESCRIPTION OF EXAMPLE EMBODIMENTS

Overview

In accordance with one embodiment, information describing a rule to be applied to a traffic stream is received at an edge network device. The traffic stream is received at the edge network device. A preliminary data analysis of the traffic stream is performed at the edge network device in accordance with the rule. A determination is made that further analysis of the traffic stream should be performed from a result of the preliminary analysis. The traffic stream data is sent to another network device for further analysis.

Example Embodiments

Figure 1:
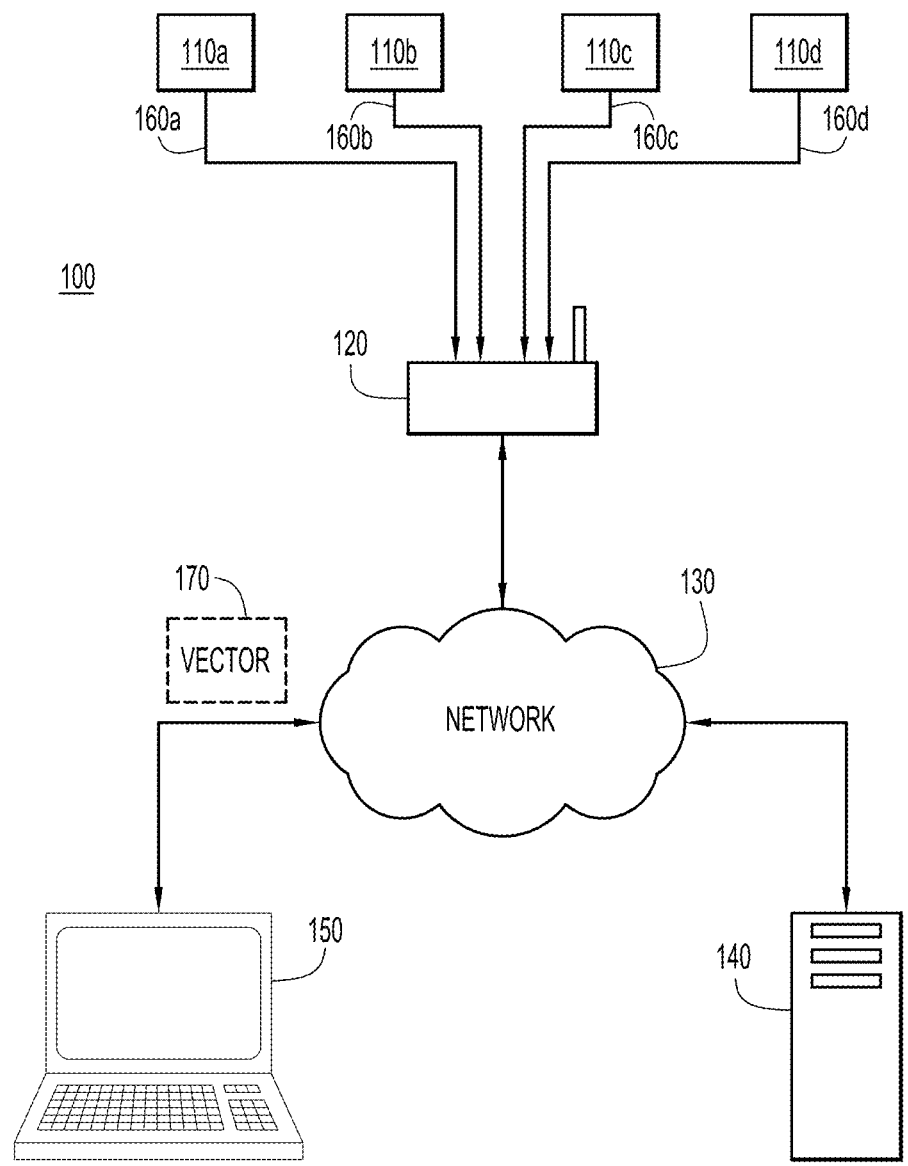
FIG. 1 is a network environment configured to provide efficient acquisition of data in an automated manner, according to an example embodiment.

Depicted in FIG. 1 is a network environment 100 configured to provide for the efficient acquisition of data in an automated manner. Specifically, the network environment 100 comprises sensors or other data sources 110a-d, an edge network device 120, a network 130, a data backend 140, and one or more users 150. Within this architecture, data or traffic streams 160a-d are received from the sensors and/or data sources 110a-d at the edge network device 120. Accordingly, as used herein, an edge network device may refer to a first-hop network device. Example embodiments of edge network devices include first-hop devices which receive traffic streams directly from IoT and/or IoE devices. As used herein, IoT and/or IoE devices refer to network connected devices configured to provide a traffic stream to an edge network device. These network connected devices may comprise sensors, cameras, and global positioning system (GPS) devices, among others. Users 150 provide vectors 170 for how the traffic streams 160a-d are to be preliminarily processed by edge network device 120. As used herein, a "vector" refers to data describing a rule that defines how the edge network device should interpret the received data, and may also define a specific event within the data which serves as an indication or "trigger" for further analysis of the data. Accordingly, these rules allow edge network device 120 to provide a preliminary analysis of the received traffic streams before some or all of the data contained in the streams is forwarded to data backend 140 or user 150 for further processing and/or storage. The vectors 170 provided by the user 150, may result in the data in the data steams 160a-d being forwarded to the data backend 140 or to the one or more users 150 once a preliminary analysis is performed by edge network device 120. Vectors 170 may also define further actions to be taken by data sources 110a-d, backend 140 and/or users 150, in accordance with the techniques described herein.

Network environment 100 may be configured to address IoT and/or IoE challenges. For example, from a particular user's perspective, not all data in one or more of traffic streams 160a-d may be of interest. Accordingly, the ability to perform preliminary processing and/or analysis of the data in traffic streams 160a-d at the edge network device 120 provides benefits for both users 150 and data backend 140. Furthermore, the preliminary processing and/or analysis performed at edge network device 120 may be used to trigger subsequent context-aware actions, thereby providing further benefits. In some IoT and/or IoE scenarios, multiple endpoints or users may need to access different parts of the same traffic stream. By allowing users 150 to establish rules embodied in vectors 170, edge network device 120 can be instructed to provide only the portions of traffic streams 160*a-d* indicated in vectors 170. In other words, vectors 170 may define different actions that may be taken in response to the preliminary analysis performed at edge network device 120, including delivery of some or all of the received data to user 150 and/or data backend 140. Furthermore, the preliminary analysis may take place at the line rate (i.e., the data transmission speed of traffic streams 160*a-b*) or in "real-time." Because the preliminary analysis takes place in real-time, timely streams of data may be delivered to higher order analytic entities, such as users 150 and data backend 140. Moreover, this delivery of the content can be requested by users at different times via multiple delivery methods through the use of time-sensitive rules or multiple nested rules.

Vectors 170 can also provide mechanisms to understand, index and search the content of traffic streams 160*a-d*. For example, vectors 170 can instruct the edge network device 120 to take a variety of different actions in response to traffic streams 160*a-d* that match conditions in Open System Interconnection (OSI) Model Layer 3 (L3), Layer 4 (L4) and Layer 7 (L7) headers, as well as packet content. By preliminarily analyzing this content, vectors 170 provide rules for interpreting traffic in specific ways, including identifying specific types of traffic and/or specific content that should be forwarded to users 150 and/or data backend 140. The vectors 170 defining such conditions and actions may be generated through a standard Application Programming Interface (API) by a user 150. For example, a particular rule generated by user 150 may cause edge network device 120 to deliver different parts of the same flow to different endpoints/uniform resource identifiers (URI) after preliminarily processing it at the edge network device 120. According to other examples, a rule may actuate sensors or trigger other policies if one or more of the traffic streams 160*a-d* meets the conditions of a policy set by the rule, as determined by preliminarily processing of one or more of traffic streams 160*a-d*. Additional examples of the preliminary analysis that may be embodied in vectors 170 include:

1: Applying matching criteria for L3 and L4 headers. In particular, users may select data for further processing by matching on a specific value or a range of values of IP addresses and ports.
2: Placing conditions on which types of traffic are captured by the edge network device based on the L7 application specific headers. For example, a vector may indicate that traffic of a specific type of data or video traffic of a certain encoding and/or specific resolution should be selected for further processing and analysis.
3: Conditioning the execution of certain actions on the results of user-defined queries which are run against the traffic streams. For example, a vector may define a condition that says the traffic which is hypertext transfer protocol (HTTP) traffic, the content of which is text and/or html data, and the host of which is "www.serviceprovider.com" should be sent to a particular user or data backend. In other words, html files arriving from serviceprovider.com will serve as a trigger to forward the contents of the traffic stream to another device for further processing.
4: Specifying actions to take on the received traffic stream. Actions can include copying and delivering the entire stream, or a part thereof, to a number of specified URI endpoints, optionally encapsulating, authenticating, and/or performing other processing on the data using parameters specified in the vector.
5: Actions can trigger further rules, actuate other sensors, index the data, archive the data for later retrieval, periodically poll and get samples from sensors, forward the results of a query, forward the entirety of the traffic stream, forward a subset of the traffic stream, forward only traffic stream content relevant to the parameters of a vector, or, if the content itself is indexed data, merge and forward the indexed results as a router function. Traffic streams can also be blocked or dropped based on the content of the received traffic streams.

In other words, the techniques described herein provide the ability to parse, index, semantically understand and search not only L3, L4 and L7 headers, but also the content payload of traffic streams. These capabilities make possible efficient acquisition of IoT and/or IoE stream data without user interaction. The techniques described herein also describe a rich set of actions that may be carried out on matching flows, including delivery of payload content to multiple endpoints.

Figure 2:
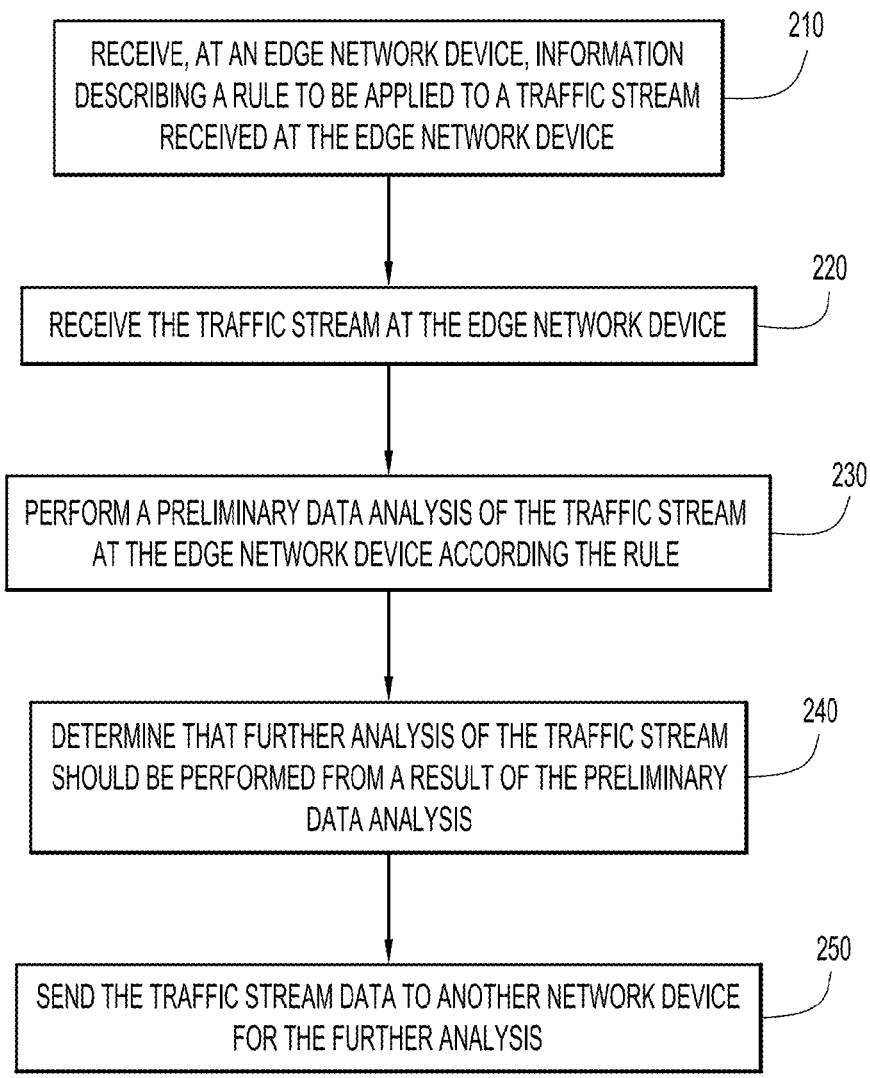
FIG. 2 is a flowchart illustrating a method for efficient acquisition of data in an automated manner, according to an example embodiment.

Depicted in FIG. 2 is a flowchart 200 illustrating a method of providing efficient acquisition of sensor data in an automated manner. The method begins in 210 where information describing a rule to be applied to a traffic stream is received at an edge network device. Specifically, the rule may be a rule defining a preliminary data analysis that is to be carried out on the received traffic stream. The information/data describing the rule may take the form of one or more vectors 170 from FIG. 1, and may be sent as a Representational State Transfer (REST) message generated by an API. According to other examples, the rule may be pre-defined during, for example, the configuration of the edge network device. Therefore, receiving information describing a rule may be interpreted to encompass receipt of a user defined rule, or the reading of a pre-defined rule previously received and stored in the edge network device. In 220, a traffic stream is received at the edge network device.

In 230, a preliminary data analysis is performed on the traffic stream according to the rule received in 210. The preliminary data analysis may involve indexing the content of the traffic stream. The preliminary data analysis may also involve interpreting the data of the traffic stream according to a schema for a particular type of data. For example, applying the schema may include interpreting the data according to a data format such as a comma separated values (CSV) data file, a text (TXT) data file, a hyper text mark-up language (HTML) data file, a extensible mark-up language (XML) data file, a JavaScript Object Notation (JSON) file, a moving picture experts group (MPEG) file, a joint photographic experts group (JPEG) file, and/or others. Furthermore, the preliminary analysis may take place in real-time (i.e., at the line rate of the received traffic stream), not only allowing for faster and more timely analysis than if the traffic was first sent to a backend system, but also allowing for relevant traffic streams to reach users as soon as possible. Finally, the preliminary analysis may look for a particular event or a particular form of data that will serve as a triggering event to initiate further analysis at another device. For example, the preliminary analysis may look for data of a particular type, or a particular value in the received traffic. Other examples of a triggering event may include looking for a certain statistical value derived from the received values. Accordingly, the preliminary analysis may comprise calculating the statistical value, which may include an average, a sum, a standard deviation, or others.

In 240, a determination is made, as a result of the preliminary data analysis, that further analysis of the traffic stream should be performed. The determination may be in response to a result of a query executed against data which has been indexed or to which a schema has been applied. The determination of the rule-triggering condition is not limited to the execution of queries. The determination may also be in response to a statistical value, such as an average, a sum or a standard deviation, surpassing a predetermined threshold.

In 250, traffic stream data is sent to another network device for further analysis. The sending of the traffic stream data may comprise sending some or all of the traffic stream to a non-edge network device, such as user 150 or backend 140 of FIG. 1. According to one specific example, if the traffic stream comprises video data, the sending of the traffic stream may comprise sending 10% of the frames to a data backend located in a cloud computing environment for analysis and eventual storage. According to other examples, the sending of the traffic stream data may comprise sending traffic stream data to another traffic stream source. For example, if the traffic stream comprises GPS data, the GPS coordinates may be sent to another edge network device, such as a camera, so that the camera can track the location identified in the coordinates, allowing monitoring from a large number of IoT and/or IoE devices without human interaction.

The process of FIG. 2 can be viewed as changing how data mining and analytic engines receive and process raw data. For example, some related systems follow a process that looks like:

Store→Analyze→Act→Notify;

Meaning, after the data is stored in a data backend (i.e., not at the edge network device), a first round of data scrubbing occurs to remove irrelevant data and/or data that is of no value to the algorithms (a.k.a. "known knowns"). Once the irrelevant data is removed, the remaining data is analyzed for events of interest. After finding the events of interest, some action is taken or some notification is made. In other words, this process basically detects triggering events after the data has been stored and scrubbed at the backend. According to the process of FIG. 2, the process takes the form of:

Analyze→Notify→Act→Store;

In example embodiments of the process of FIG. 2, only the relevant data is sent to the backend as a result of the preliminary data analysis. This improves efficiency by eliminating the redundancy of sending all the data to the back end systems, and then removing unnecessary data. As a result of the preliminary data analysis of 230, only the relevant data is sent in 250. Furthermore, because the preliminary analysis takes place in real-time (i.e., at the line rate of the traffic stream), the time required to "notify" and "act" is significantly reduced.

For example, an IoT and/or IoE enabled device may serve as a pressure sensor for a tire of a truck. This IoT sensor will provide a traffic stream of tire pressure data to an edge network device. A user may determine that the pressure for the tire should be between 40 and 50 pounds per square inch (psi), and that a pressure value outside of this range will serve as a triggering event for further analysis or further action. This rule will be sent in the form of a vector to the edge network device receiving the traffic stream from the tire sensor. In the event that the pressure in a tire is outside the indicated range, higher order analytics entities, such as a data backend, will instruct further IoT enabled devices, in this case video cameras, to record the truck as it passes various checkpoints in order to perform image analysis on the surface of the tire. A specific algorithm of the data backend determines the position and future route of the truck and calculates the set of cameras that the truck is likely to pass. Events are then created to receive a video stream when the truck passes the checkpoints. The instructions sent to the cameras from the data backend may be forwarded to the cameras via the edge network device that received the initial pressure sensor data stream. According to another example, if the edge network device also receives GPS data for the truck, the cameras may be notified directly from the edge network device receiving the pressure data, providing further efficiency.

According to this scenario, the edge network device searches for the triggering event of the pressure being outside the desire level (i.e., analyzing). The triggering event causes the edge network device to communicate with the data backend, indicating that the pressure is outside the desired range (i.e., notifying). The data backend determines the route of the truck and enables the video cameras (i.e., acting). Finally, the pressure data and video data will be retained by the data backend (i.e., storing).

The vector may be sent to the edge network device in the form of a dynamic data definition (D3) which defines how a traffic stream should be analyzed, the triggering condition which serves to notify the edge network device when data of interest is received, and the actions to be taken in response to the notification. The D3 vector will also indicate where to send the data from the traffic stream if it is to be stored by a user or a data backend.

The D3 vector may analyze an incoming data stream based on protocol parameters and content parameters. A protocol parameter may include one or both of application and/or network parameters. The content parameter may refer to the application payload. In another example embodiment, if the protocol parameter refers to only transport protocol parameters (e.g. destination port), the content parameter may refer to the transport payload. For example, if a D3 is to be applied to a traffic stream that contains both application and network protocol parameters, the content parameter(s) may refer to the application payload. In another example embodiment, if the D3 contains only transport protocol parameters (e.g. destination port), the content parameters may refer to the transport payload (e.g. Transmission Control Protocol (TCP) or User Datagram Protocol (UDP) payload). In order to determine if a triggering condition has been received in a traffic stream, the protocol, network and application parameters may be searched or queried to determine if they meet a particular pattern (e.g., subjecting the traffic stream to a statistical analysis), contain a certain value, or meet a predetermined threshold.

An action may take the form of a data management transaction relevant to the underlying data, or one or more action calls. Actions may also take the form of event-driven actions and timer-driven actions. An event-driven action is an operation that is executed in the event of pattern matches against the data. Timer-driven actions may be scheduled actions that are periodically executed based on a timer, with the timer value serving as the trigger.

Figure 3:
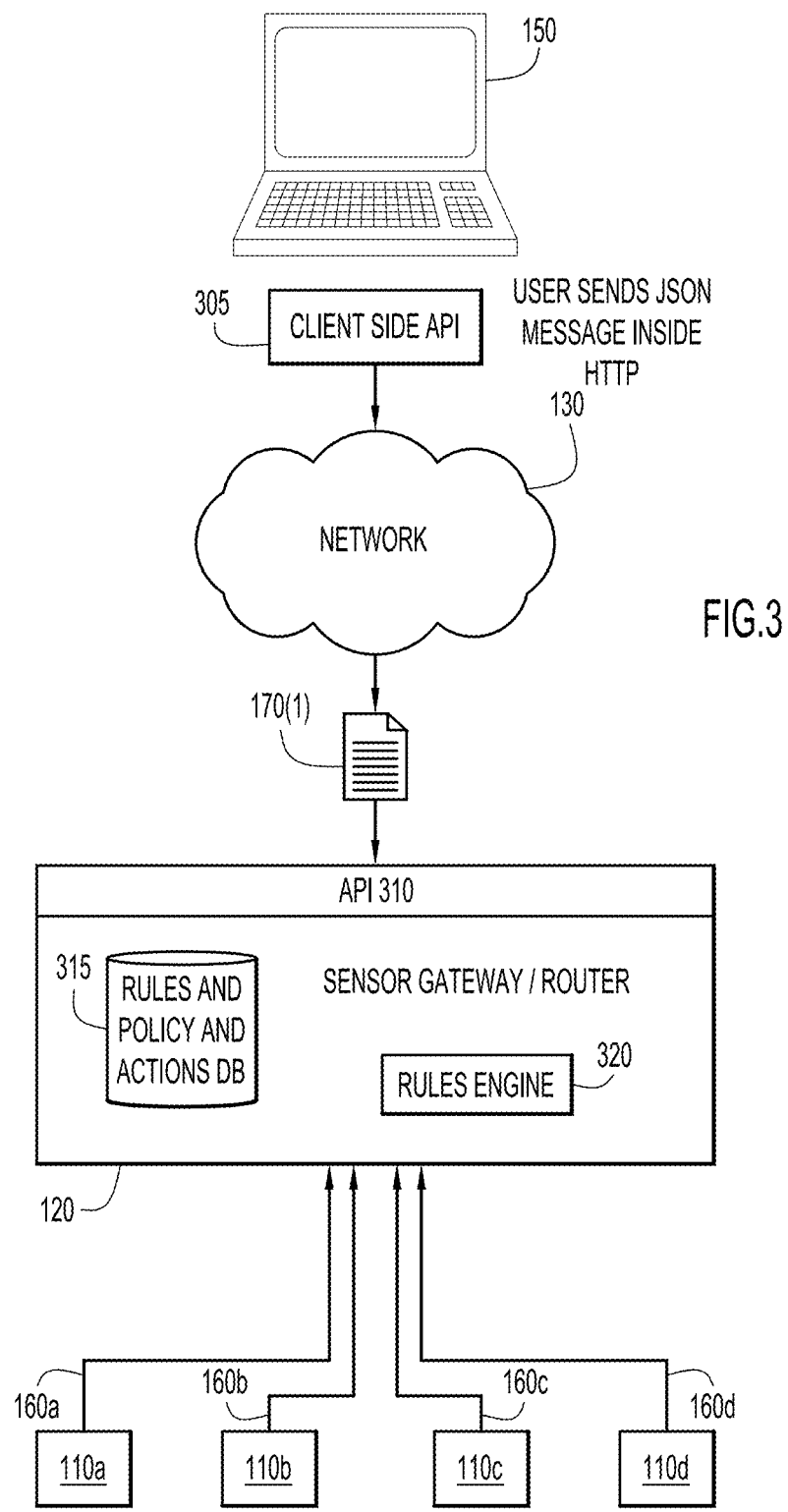
FIG. 3 is a block diagram of how a vector defining a rule, query and/or action, is sent to the edge network device from a user, according to an example embodiment.

Depicted in FIG. 3 is a more detailed example of how a vector denoted by reference numeral 170(1) (which may also include a query and action in the form of a D3), is generated by a user 150, sent to the edge network device 120, and applied at the edge network device 120. A user utilizing client device 150 may enter the elements of a vector 170(1) or a D3 through a client side API 305. Client side API 305 may be embodied in an application running on a user's workstation. The application may include a graphical user interface (GUI) and tools facilitating the creation of a desired vector. The client side API 305 may then convert the vector to a format suitable for transmission through network 130 and for processing by edge network device 120. For example, the GUI of client side API 305 may allow a user to graphically construct a query or define triggering events which will subsequently be converted by client side API 305 to the appropriate query language for execution at edge network device 120 and/or converted into a JSON file format for transmission and processing at edge network device 120. The vector 170(1) or D3 is sent through the network 130 to the edge network device 120 where it is received at an API 310 located at the edge network device 120. The vector 170(1) or D3 is stored in a rules and policies database 315 at the edge network device 120, and is applied to traffic streams 160*a-d* through a rules engine 320 located at the edge network device 120.

The vector 170(1) or D3 sent from the user specifies:
1: Meta data about rule;
2: Filters on OSI Model Layer 3, Layer 4 and Layer 7 headers;
3: A query, rule or event triggering analysis to be carried out on the payload and/or content of traffic streams 160*a-d*; and/or
4: A list of actions to take on the payload in response to the triggering event.

Accordingly, vector 170(1) may include predicates and filters to apply to the data of a received traffic stream, methods of converting the data received in the traffic stream, algorithms to summarize the data contained in the traffic stream (e.g., statistical calculations to be performed on the data, such as averages, summations, etc.), pattern matching algorithms to apply to the data in the traffic stream, methods of categorizing and classifying the data received in the traffic stream, and others.

The client side API 305 may be a Representational State Transfer (RESTful) API for a programmer to specify and describe the data of interest. The edge device 120 may also have the capability to understand the semantics of the content and/or payload of the sensor data. The client side API 305, in this case, can also be used to write queries describing the semantic content, which if matched against content can result in further actions. In essence, a user 150 writes a program that specifies what data is of interest or how a triggering event is to be identified. The API 305 helps the user translate the rules into a format that can be read by the edge network device 120, such as a standard and open JSON format encapsulated as a REST message. The message generated by API 305 can then be understood by the API 310 at the edge network device 120.

The API 310 at the edge network device 120 will receive the REST messages containing the JSON payloads that express the rules (e.g., a program identifying a triggering event), and will register them in rules and policies database 315. A component of API 310 translates the rules from JSON format to the internal format of the edge network device 120. The API 310 will be responsible for translating the JSON messages into internal representations that can be understood by the edge network device 120.

Traffic streams 160*a-d* that flow through edge network device 120 are searched against the rules in database 315. Edge network device 120 may have the ability to translate, decompress, decode and otherwise manipulate the payload of traffic streams 160*a-d* in order to index and search the payload and content of the data. Edge network device 120 may also execute ad hoc queries on the payload. Accordingly, traffic streams 160*a-d* may be searched in real-time using the edge network device API 310 to discover information indicated in the D3 of vector 170(1) from the raw data received in traffic streams 160*a-d*. The rules in rules and policies database 315 may also specify what should be done with the matching traffic.

In order to process traffic streams 160*a-d* at the line rate (i.e., in real-time), API 310 may utilize a combination of indexing and vector matching to organize the received traffic stream, and determine when a triggering event has taken place. Specifically, as the data is received at edge network device 120, the protocol headers for the packets of traffic streams 160*a-d* are hashed in a collision free table. The payload components of the received packets are passed through preprocessor algorithms to remove redundant and irrelevant data. The remaining relevant data is then indexed, and the index anchors are merged with the collision free hash table. The hash keys are then matched with the rule defined by the D3 using a vector equivalence technique. "Vector" as used in reference to vector equivalence techniques is not referring the vector or D3 file sent to the edge network device. Instead, a vector equivalence technique expresses a pattern as a series of weighted variables, or as a vector. The variables and their respective weights may be defined in the D3 vector sent from the user 150 to edge network device 120. Accordingly, the triggering event will be expressed as a pattern of weighted variables, and the data received at the edge network device will be searched for the same pattern of weighted variables. The matching may also include operating on the weighted variables using mathematical formulas and/or algorithms. This matching of the hash keys only takes logarithmic time to complete. In other words, the time for completing the processing grows with the logarithm of the increase in complexity, and therefore, the process is very efficient and can be scaled-up to handle very large amounts of traffic. Using "big 0" notation, the time to complete the process, T, is:

$$T(n)=O(\log n).$$

Figure 4:
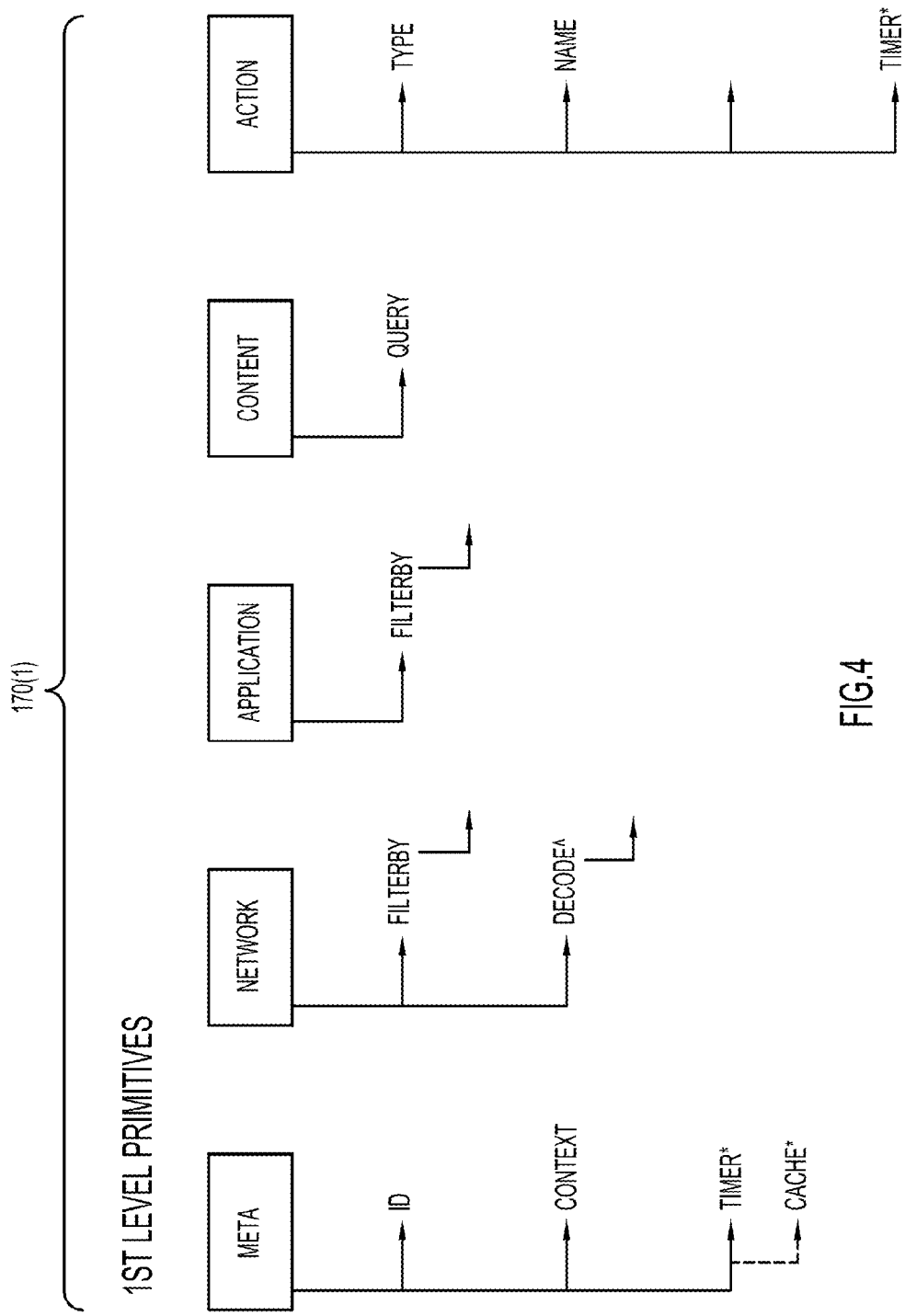
FIG. 4 illustrates the components, particularly the first level primitives of a JavaScript Object Notation (JSON) file which defines a rule, query and/or action, in order to provide efficient acquisition of data in an automated manner, according to an example embodiment.

With reference now made to FIG. 4, illustrated therein are the components, particularly the first level primitives, of a vector 170(1), and more specifically, a JSON D3 file. The JSON message of vector 170(1) contains the following top-level blocks:

The Meta primitive: This block describes the meta-data about the D3.

The Network primitive: This block describes the network parameters upon which the rules of the D3 will be applied.

The Application primitive: This describes the application level fields of interest upon which the rules of the D3 will be applied.

The Content primitive: This describes what queries are to be run on the content/payload of a traffic stream.

The Action primitive: This describes actions to be run on the traffic stream, and events that trigger the performing of the action.

Figure 5:
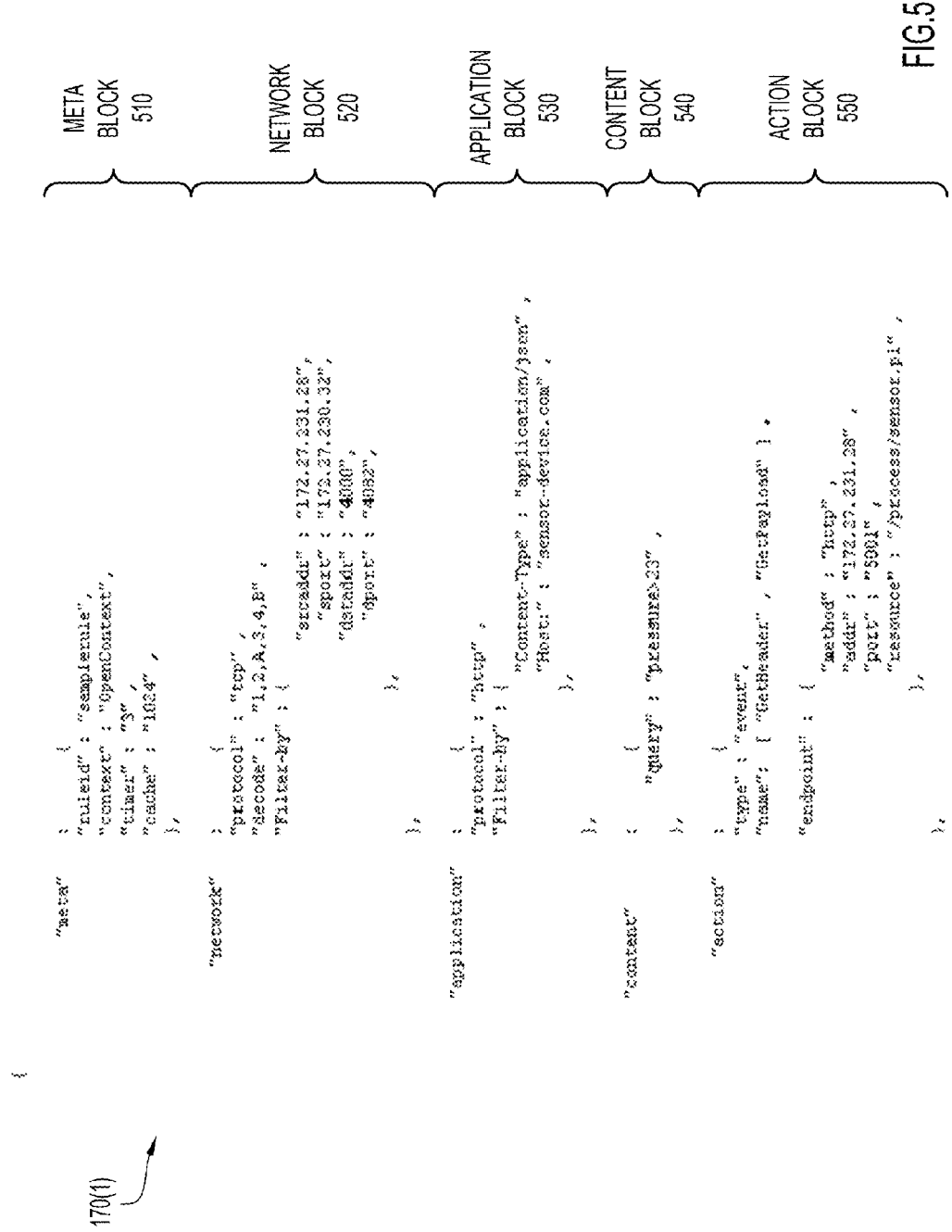
FIG. 5 illustrates a first example of a specific JSON file in order to provide a rule, query and/or action, according to an example embodiment.

Depicted in FIG. 5 is a more specific example of a vector 170(1) embodied in a JSON message. The first portion of the JSON file of vector 170(1) is the meta block 510 which contains the following fields:

A. "ruleid": This is the name of the D3 and serves as a reference for the specific vector included in the JSON file.

B. "context": This specifies the context under which the D3 is to be run.

C. "timer": This specifies how frequently the data that has been acquired via a traffic stream should be processed. This may be specified in milliseconds.

D. "cache": Similar to the "meta.timer" field, this specifies how frequently (in terms of bytes seen) the data acquired via a traffic stream should be processed.

The network block 520 describes the network parameters of interest and specifies which data is to be processed. This block contains the following fields:

a. "protocol": This field specifies the transport protocol of interest, e.g. UDP/TCP.

b. "decode": If a payload is encapsulated in TCP or UDP transport without an L7 application header, the decode format string can be used to specify how the payload should be decoded. This allows the user to specify the data model of the payload and to write queries on the payloads specific to the data model. The "decode" field is typically used in situations where the data generator (e.g. sensor) sends a packet with a binary payload that needs to be interpreted as integers, characters or other data types.

c. "Filter-by": This block specifies the set of 4-tuples (source IP address, source port, destination IP address, destination port) the user is interested in. This block contains the following fields in the specified formats:

i. "srcaddr": This field specifies a range of source IP addresses of interest.

ii. "srcport": This field specifies the set of source port number ranges of interest, and may include a list of comma-separated values. e.g. "[3212,1214,2118-2144]."

iii. "dstaddr": This field is similar to that of "srcaddr," but identifies destination addresses of interest.

iv. "dstport": This field is similar to that of "srcport," but identifies destination ports of interest.

The application block 530 specifies which application-level protocol fields to filter by, and includes the following fields:

a. "protocol": This field specifies the application or L7 protocol to be filtered or queried, e.g. HTTP, simple mail transfer protocol (SMTP), etc.

b. "Filter-by": This field matches directly on name-value pairs in the L7 header, where the name is supplied by the user. For example, a user may want to match on the "Content-Type" of an XML file received from a specific HOST sent according to the HTTP protocol. Accordingly, the application block may take the form of, for example:

```
"application" :
{
    "protocol" : "http",
    "Filter-by" :
    {
        "Content-Type:" : "application/xml",
        "Host:"         : "sensor-device.com",
    },
}
```

The content block 540 specifies what queries are to be run on the content/payload, and includes the following field:

"query": This specifies a query condition to be run against the data in the traffic stream.

In other words, a query condition is a condition set against the specific fields that are found in the payload of the traffic stream. If the query condition is met, a triggering event is located within the traffic stream. According to the example in content block 540, the query condition looks for payloads with a pressure value greater than a threshold of 23, and takes the form of:

"query": "pressure>23"

Accordingly, when the pressure reading has a value greater than "23," the edge network device will determine that a triggering event has taken place, and will carry out an action, which will be described below in reference to action block 550.

Furthermore, because the payload fields are present in real-time in the traffic stream, determining the underlying schema of the data in the traffic stream can be done in real-time, and need not be predetermined. For example, an edge network device may be equipped with specific drivers which are used to parse the data and, if present, extract an underlying schema. For example, schemas determined in this way may include CSV, XML, JSON, TXT, and HTML schemas. Accordingly, the drivers located at the edge network device may parse the data of the stream in real-time to determine if the data is, for example, CSV, XML, JSON, TXT, HTML, or another type of data. Once the schema for the data of a traffic stream is determined, conditions and queries can be generated which are directed to specific aspects of the data's schema. Said differently, the content of a received traffic stream may be analyzed to determine if the that conforms to a particular schema. Once the schema of the data is determined, schema specific attributes of the content may be analyzed in order to apply rules to the traffic stream. This analysis may take the form of executing a query against the content. In response to the analyzing of the schema-specific attributes of the content, a rule may be applied to the traffic stream.

Using a CSV schema as an example, once it is determined that the traffic stream includes CSV data, the edge network device can determine conditions specific to CSV data. Specifically, the edge network device may assign the letter "A" for the first column, "B" for the second column, and so forth, for the columns of the CSV data. Once this schema is applied to the data, queries and conditions, such as "A=value" and or "B=value" can be executed against the traffic stream.

The XML schema may include structured and unstructured data. The structured data may be represented, for example, in the attributes field in an XML tag. The unstructured data may be found between "begin" and "end" tags of the XML data. Accordingly, once the XML schema is applied to the data of the traffic stream, queries and conditions can be executed against both the overall structure of the XML data and the unstructured data.

HTML and TXT formats generate free-text or unstructured data. Each extracted word from HTML and free-text formats may be used as a valid keyword against which queries and conditions can be executed. Accordingly, the parser for HTML will attempt to discard HTML tags. According to other examples, queries and conditions may be executed that are based on the content of specific tags, and therefore, the HTML tags may be retained. For example, a query may be limited to the values within image tags of an HTML file.

The JSON format has an inherently dynamic schema. Specifically, nomenclature for JSON objects follows a typical object model such as in "obj1.obj2.obj3=value." Accordingly, if the data of the traffic stream comprises JSON object formatted data, query and condition statements may be written that utilize this format. For example, data in a JSON traffic stream may take the following format:

```
{
    "Sensor":"GPS",
    "Timestamp":1326369894582,
      "State":
        {
          "Longitude":71.30362551,
          "Altidude":25.5,
          "Latitude":42.66195771
        }
}
```

A query or condition statement may take the form of "Sensor=GPS" or "state. Altitude=25.5."

Referring again to FIG. 5, the action block 550 defines which actions are to be taken in response to the filters and policies set earlier in the vector 170(1). In the example of FIG. 5, "type" specifies the type of the action. For example, the "type" of the action may take the form of an event-driven action or a timer-driven action.

Other attributes of action block 550 may include:
a. "period": This field may be specified for timer-driven actions and ignored for event-driven actions. It specifies the frequency of operation for timer-driven actions.
b. "endpoint": This field describes the endpoint URI for where the results of the actions are to be sent.
c. "method": This field specifies the protocol to be used. If "http" is specified, the results will be encapsulated in an HTTP header with meta-data about the results. If left empty, the results may be sent in, for example, a TCP payload.
d. "addr": This field identifies the IP address of the destination endpoint.
e. "port": This field identifies the port number for the destination endpoint.
f. "resource": This field identifies the resource on the destination endpoint that will process the results.

Event driven actions are executed in response to filters or patterns specified in the D3 queries or conditions. For example, a D3 may specify that when JSON traffic is seen encapsulated in HTTP, then the original Header and the Original Payload should be processed. Furthermore, multiple event-driven actions can be chained together. Examples of event-drive actions are:
GetHeader: Send original HTTP header to a resource.
GetPayload: Send original HTTP payload to a resource.
Syslog: Send logging information to a resource.
GpsUpdate: Send GPS location information upon trigger to a resource.

These actions may serve the notification function, e.g., sending the data to the data backend thereby notifying the backend that the triggering event has taken place. These actions may also serve the action function, e.g., logging and continued monitoring of the data in response to a triggering event.

Timer-driven actions may be built-in actions that are not triggered by matches on queries, but are carried out at predetermined intervals. The interval may be specified by the "action.period" field of the action block 550. For example, a user may want to specify that every 1000 milliseconds (1 second), the edge network device should fetch data from sensors (i.e. run the action FETCHDATA periodically). Actions such as GPSUPDATE and SYSLOG can be triggered by both timer and event conditions. FETCHDATA and GPSUPDATE are example timer actions, and are described in more detail below.

FETCHDATA performs an HTTP GET on an endpoint device, such as an IoT and/or IoE device. The typical usage is to have a FETCHDATA rule to periodically pull data from sensors, and have another rule that will process the data. Though, it is not mandatory to have a secondary rule process the data pulled by the FETCHDATA action.

GPSUPDATE is an example of a timer action where the edge network device does not process the resulting traffic. In this case, an edge network device periodically sends GPS information to a server using HTTP PUT.

With reference made to FIG. 6, illustrated therein is another JSON formatted vector 170(2) which performs basic authorization using a 64-bit encoding of a username, and performs an action which delivers content to a device with the address "172.27.231.28" on port "5001" using the "http" protocol. In other words, the edge network device will analyze the data to see if it contains the correct authentication credentials, determines that the stream is authenticated (i.e., "notifies"), and delivers the authenticated content to the correct address (i.e., "acts").

Figure 7:
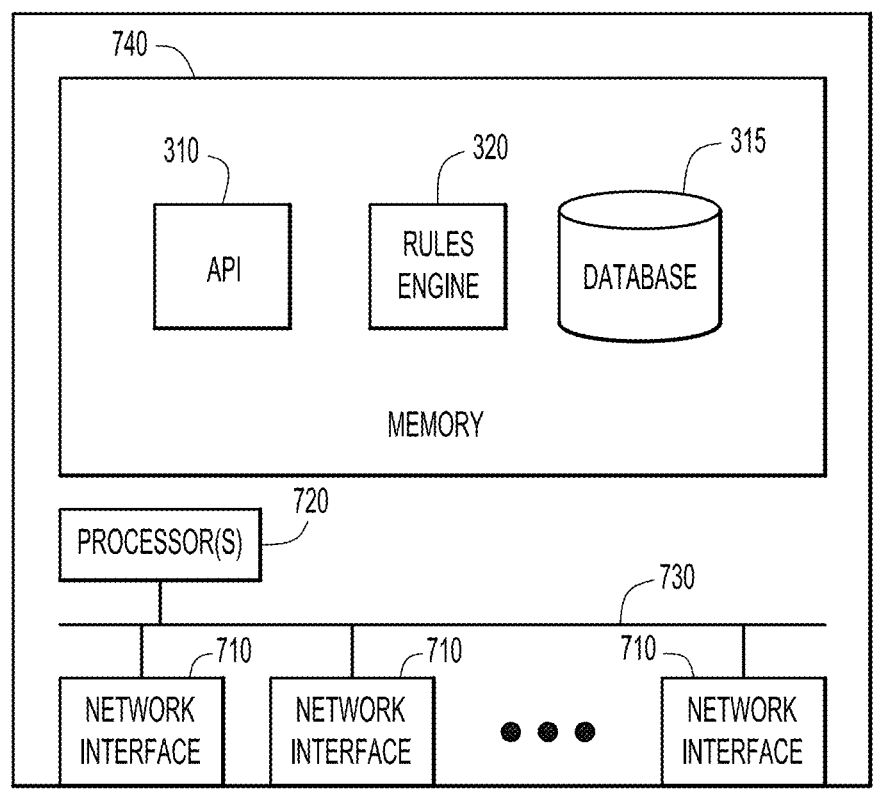
FIG. 7 is a block diagram illustrating a device configured to provide efficient acquisition of data in an automated manner, according to an example embodiment.

Referring now to FIG. 7, an example block diagram is shown of an edge network device 120 configured to perform the techniques described herein. Edge network device 120 comprises network interfaces (ports) 710 which may be used to connect to IoT and/or IoE devices, such as sensors, or to backend and end user systems through a network. A processor 720 is provided to coordinate all controls and functions of edge network device 120. The processor 720 is, for example, a microprocessor or microcontroller, and it communicates with the network interface 710 via bus 730. Memory 740 comprises software instructions which may be executed by the processor 720. For example, software instructions for edge network device 120 includes instructions for edge network device API 310 and or rules engine 320, as described above. Policy database 315 may also be stored in memory 740. In other words, memory 740 includes instructions that enable edge network device 120 to carry out the operations described above in connection with FIGS. 1-9.

Memory 740 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 740 may comprise one or more tangible (non-transitory) computer readable storage media (e.g., a memory device) encoded with software comprising computer executable instructions. When the software, e.g., process logic for API 310 and rules engine 320, is executed (by the processor 720), the processor is operable to perform the operations described herein in connection with FIGS. 1-6.

Thus, in one form, an apparatus is provided comprising a network interface unit to enable communication over a network on behalf of an edge network device, and a processor coupled to the network interface unit, to: receive information describing a rule to be applied to a traffic stream at the edge network device; receive the traffic stream at the edge network device, perform a preliminary data analysis of the traffic stream at the edge network device in accordance with the rule; determine that further analysis of the traffic stream should be performed from a result of the preliminary analysis; and cause traffic stream data to be sent to another network device for further analysis.

Similarly, one or more computer readable storage media are provided encoded with software comprising computer executable instructions and when the software is executed operable to: receive information describing a rule to be applied to a traffic stream at an edge network device; receive the traffic stream at the edge network device; perform a preliminary data analysis of the traffic stream at the edge network device in accordance with the rule; determine that further analysis of the traffic stream should be performed from a result of the preliminary analysis; and cause traffic stream data to be sent to another network device for further analysis.

In still another form, a method is provided comprising: receiving, at an edge network device, information describing a rule to be applied to a traffic stream received at the edge network device; receiving the traffic stream at the edge network device; performing a preliminary data analysis of the traffic stream at the edge network device according to the rule; determining that further analysis of the traffic stream should be performed from a result of the preliminary data analysis; and sending traffic stream data to another network device for the further analysis.

The above description is intended by way of example only. Various modifications and structural changes may be made therein without departing from the scope of the concepts described herein and within the scope and range of equivalents of the claims.

What is claimed is:

1. A method comprising:
   receiving, at an edge network device, information describing a rule to be applied to a traffic stream received at the edge network device;
   receiving the traffic stream at the edge network device;
   performing a preliminary data analysis of the traffic stream at the edge network device according to the rule, wherein performing the preliminary data analysis comprises indexing data of the traffic stream received at the edge network device to produce indexed data, and executing a query against the indexed data;
   receiving a query result in response to executing the query;
   determining that further analysis of the traffic stream should be performed based upon the query result; and
   sending traffic stream data to another network device for the further analysis.

2. The method according to claim 1, wherein performing the preliminary data analysis comprises indexing a subset of the traffic stream, wherein the subset of the traffic stream is defined by the rule.

3. The method according to claim 1, wherein performing the preliminary data analysis comprises executing the query against the indexed data and non-indexed data obtained from the traffic stream received at the edge network device.

4. The method according to claim 1, further comprising:
   receiving instructions configured to control a network connected device connected to the edge network device in response to the further analysis, and
   forwarding the instructions to the network connected device.

5. The method according to claim 4, further comprising receiving the traffic stream at the edge network device from the network connected device in response to the forwarding of the instructions.

6. The method according to claim 1, wherein the preliminary analysis includes determining a data type of the received traffic stream.

7. The method according to claim 6, wherein:
   determining the data type of the traffic stream includes determining that the traffic stream comprises a video data type; and
   sending the traffic stream data to the another network device for the further analysis includes sending a subset of video frames to a non-edge network device.

8. The method according to claim 1, wherein:
   the preliminary analysis includes performing a statistical analysis on values received in the traffic stream, and
   determining that further analysis of the traffic stream should be performed from the result of the preliminary data analysis includes determining a threshold value is met in the statistical analysis.

9. The method according to claim 1, wherein performing the preliminary data analysis includes analyzing the data at a predetermined interval, wherein the predetermined interval includes at least one of a time interval or an interval based on the quantity of traffic received from the traffic stream.

10. An apparatus comprising:
    a network interface unit to enable communication over a network on behalf of an edge network device; and
    a processor coupled to the network interface unit, and configured to:
      receive information describing a rule to be applied to a traffic stream;
      receive the traffic stream via the network interface unit;
      perform a preliminary data analysis of the traffic stream according to the rule, by indexing data of the traffic stream received at the edge network device to produce indexed data, and executing a query against the indexed data;
      receive a query result in response to executing the query;
      determine that further analysis of the traffic stream should be performed based upon the query result; and
      cause traffic stream data to be sent via the network interface unit to a network device for the further analysis.

11. The apparatus of claim 10, wherein the processor performs the preliminary data analysis by indexing a subset of the traffic stream, wherein the subset of the traffic stream is defined by the rule.

12. The apparatus of claim 10, wherein the processor further:
    receives instructions via the network interface unit, wherein the instructions are configured to control a network connected device in response to the further analysis; and
    forwards the instructions to the network-connected device via the network interface unit.

13. The apparatus of claim 12, wherein the processor receives traffic via the network interface unit from the network connected device in response forwarding of the instructions.

14. The apparatus of claim 10, wherein the processor performs the preliminary data analysis by determining a data type of the traffic stream.

15. The apparatus of claim 10, wherein the processor:
    performs a statistical analysis on values received in the traffic stream; and
    determines that further analysis of the traffic stream should be performed by determining that a threshold value is met in the statistical analysis.

16. The apparatus of claim 10, wherein the processor performs the preliminary data analysis by analyzing the data at a predetermined interval, wherein the predetermined interval includes at least one of a time interval or an interval based on the quantity of traffic received from the traffic stream.

17. One or more non-transitory computer readable storage media encoded with software comprising computer executable instructions and when the software is executed operable to:
- receive, at an edge network device, information describing a rule to be applied to a traffic stream;
- receive the traffic stream at the edge network device;
- perform a preliminary data analysis of the traffic stream according to the rule by indexing data of the traffic stream received at the edge network device to produce indexed data, and executing a query against the indexed data;
- receive a query result in response to executing the query;
- determine that further analysis of the traffic stream should be performed based upon the query result; and
- cause traffic stream data to be sent to a network device for the further analysis.

18. The non-transitory computer readable storage media of claim 17, wherein the instructions operable to index include instructions to index a subset of the traffic stream, wherein the subset of the traffic stream is defined by the rule.

19. The non-transitory computer readable storage media of claim 17, further comprising instructions operable to:
- receive instructions configured to control a network connected device connected to the edge network device in response to the further analysis, and
- forward the instructions to the network connected device.

20. The non-transitory computer readable storage media of claim 19, further comprising instructions operable to receive traffic from the network connected device in response to forwarding of the instructions.

21. The non-transitory computer readable storage media of claim 17, wherein the instructions operable to perform the preliminary data analysis include instructions operable to determine a data type of the traffic stream.

22. The non-transitory computer readable storage media of claim 17, wherein the instructions operable to perform the preliminary data analysis include instructions operable to perform a statistical analysis on values received in the traffic stream, and
- wherein the instructions operable to determine that further analysis of the traffic stream should be performed include instructions to determine that a threshold value is met in the statistical analysis.

23. The non-transitory computer readable storage media of claim 17 wherein the instructions operable to perform the preliminary data analysis include instructions operable to analyze the data at a predetermined interval, wherein the predetermined interval comprises at least one of a time interval or an interval based on the quantity of traffic received from the traffic stream.

24. The method of claim 1, wherein:
- indexing the data of the traffic stream includes:
  - hashing the data of the traffic stream into a collision free table; and
  - merging index anchors of the indexed data with the collision free table; and
- executing the query against the indexed data includes matching a hash key corresponding to a query value with a hash key in the collision free table using the index anchors.

25. The apparatus of claim 10, wherein:
- the processor is configured to index the data of the traffic stream by:
  - hashing the data of the traffic stream into a collision free table; and
  - merging index anchors of the indexed data with the collision free table; and
- the processor is configured to execute the query against the indexed data by matching a hash key corresponding to a query value with a hash key in the collision free table using the index anchors.

26. The tangible, non-transitory computer readable storage media of claim 17, wherein:
- the instructions operable to index the data of the traffic stream are operable to:
  - hash the data of the traffic stream into a collision free table; and
  - merge index anchors of the indexed data with the collision free table; and
- the instructions operable to execute the query against the indexed data are operable to match a hash key corresponding to a query value with a hash key in the collision free table using the index anchors.

* * * * *